(12) United States Patent
Danjo

(10) Patent No.: US 11,593,071 B2
(45) Date of Patent: Feb. 28, 2023

(54) ARITHMETIC PROCESSING APPARATUS, CONTROL METHOD OF ARITHMETIC PROCESSING APPARATUS, AND NON-TRANSITORY COMPUTER-READABLE STORAGE MEDIUM FOR STORING PROGRAM

(71) Applicant: FUJITSU LIMITED, Kawasaki (JP)

(72) Inventor: Takumi Danjo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 265 days.

(21) Appl. No.: 16/874,729

(22) Filed: May 15, 2020

(65) Prior Publication Data
US 2020/0371750 A1 Nov. 26, 2020

(30) Foreign Application Priority Data
May 21, 2019 (JP) .............................. JP2019-095467

(51) Int. Cl.
*G06F 17/18* (2006.01)
*G06F 15/80* (2006.01)
*G06F 7/57* (2006.01)

(52) U.S. Cl.
CPC ................ *G06F 7/57* (2013.01); *G06F 15/80* (2013.01); *G06F 17/18* (2013.01); *G06F 2207/4824* (2013.01)

(58) Field of Classification Search
CPC .... G06N 3/08; G06N 3/084; G06F 15/17318; G06F 15/17381; G06F 15/8015;
(Continued)

(56) References Cited

U.S. PATENT DOCUMENTS

2008/0183779 A1* 7/2008 Jia .......................... G06F 9/546
 708/1
2019/0188563 A1* 6/2019 Toda ......................... G06N 3/08
(Continued)

FOREIGN PATENT DOCUMENTS

JP 2000-20501 A 1/2000
JP 2000-339278 A 12/2000

OTHER PUBLICATIONS

European Official Communication dated Feb. 10, 2022 for corresponding European Patent Application No. 20175284.7, 8 pages. Please note US-2008/0183779-A1 and NPL Guy E. Blelloch et al., "Parallel Algorithms". . . cited herewith, was previously cited in an IDS filed Oct. 23, 2020.
(Continued)

*Primary Examiner* — Matthew D Sandifer
(74) *Attorney, Agent, or Firm* — Fujitsu Patent Center

(57) ABSTRACT

An arithmetic processing apparatus includes: a plurality of nodes (N nodes) capable of communicating with each other, each of the plurality of nodes including a memory and a processor, the memory being configured to store a value and an operation result, the processor being configured to execute first processing when N is a natural number of 2 or more, n is a natural number of 1 or more, and $N \neq 2^n$, wherein the first processing is configured to divide by 2 a value held by a first node, the first node being any of the plurality of nodes and a last node in an order of counting, obtain one or more node pairs by pairing remaining nodes among the plurality of nodes exception for the first node, and calculate repeatedly an average value of values held by each node pair of the one or more node pairs.

3 Claims, 13 Drawing Sheets

(58) Field of Classification Search
CPC .... G06F 15/17375; G06F 15/80; G06F 9/546; G06F 17/18
See application file for complete search history.

(56) References Cited

U.S. PATENT DOCUMENTS

2020/0175370 A1* 6/2020 Zhang ............... G06N 20/00
2021/0056416 A1* 2/2021 Kato ............... G06F 13/4027

OTHER PUBLICATIONS

Blelloch, Guy E. et al., "Parallel Algorithms", In:"Algorithms an theory of computation handbook: special topics and techniques", Jan. 1, 2020, Chapman & Hall/CRC, XP055732302, pp. 25-1-25-43.
Extended European Search Report dated Sep. 29, 2020 for corresponding European Patent Application No. 20175284.7, 12 pages.

* cited by examiner

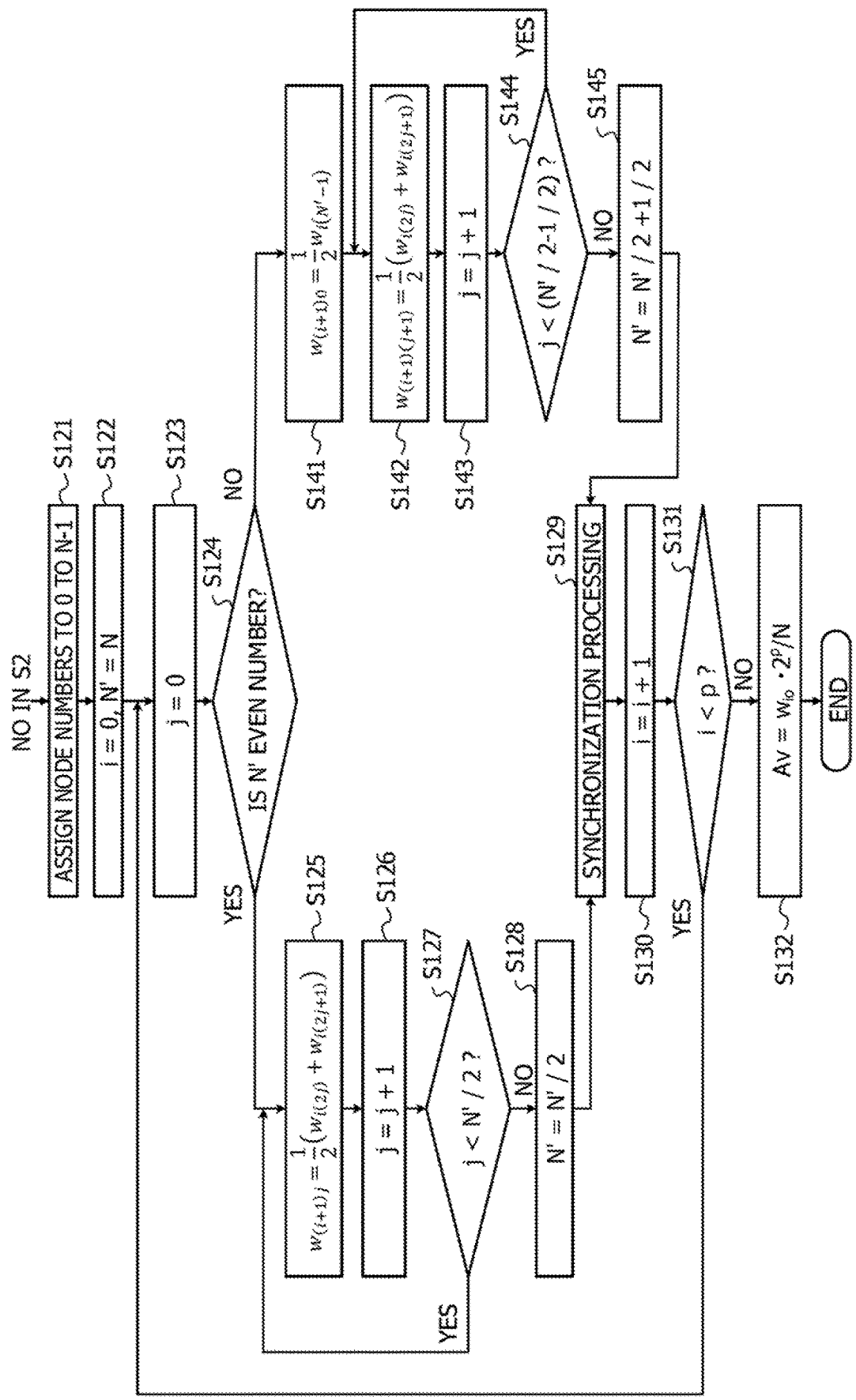

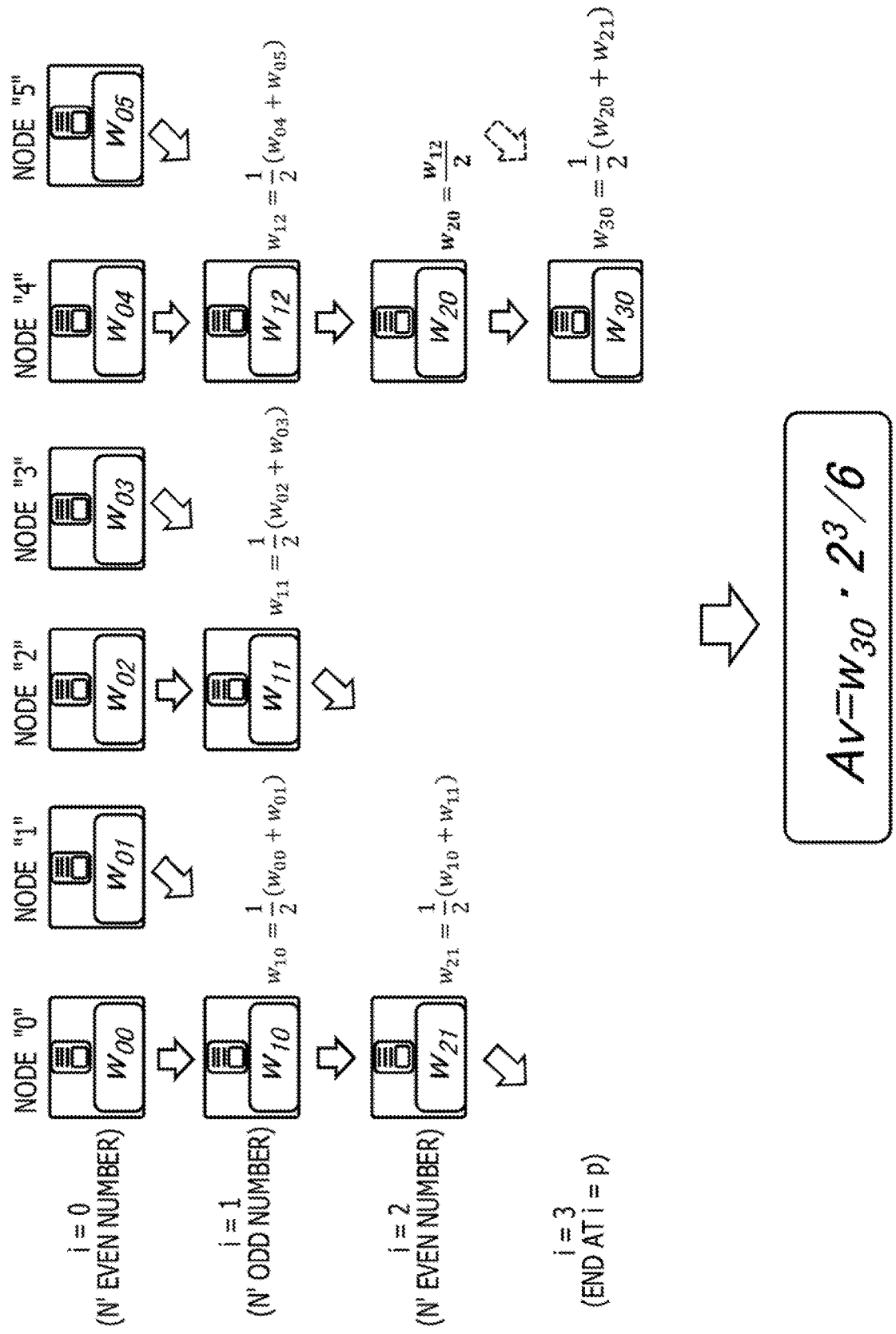

ARITHMETIC PROCESSING APPARATUS, CONTROL METHOD OF ARITHMETIC PROCESSING APPARATUS, AND NON-TRANSITORY COMPUTER-READABLE STORAGE MEDIUM FOR STORING PROGRAM

CROSS-REFERENCE TO RELATED APPLICATION

This application is based upon and claims the benefit of priority of the prior Japanese Patent Application No. 2019-95467, filed on May 21, 2019, the entire contents of which are incorporated herein by reference.

FIELD

The embodiment discussed herein is related to an arithmetic processing apparatus, a control method of the arithmetic processing apparatus, and a non-transitory computer-readable storage medium for storing a program.

BACKGROUND

In recent years, techniques such as high-performance computing (HPC), data science, machine learning (ML), deep learning (DL), or the like have been used in various fields. These techniques are difficult to process data in a single processor in order to perform an enormous amount of calculations. Therefore, when using these techniques, there is introduced a parallel computer that divides and assigns data to many processors and performs calculations in parallel to increase the speed. The parallel computer includes a plurality of nodes formed by a processor, a memory, and a communication device and couples the plurality of nodes via a network to perform data communication between the processors.

For example, when DL is performed, a plurality of neuron layers are prepared in a parallel computer. Forward processing of obtaining output data from input data, backward processing of comparing the output data and a correct answer to obtain a difference, and update processing of updating parameters used in each neuron layer by using the difference are repeatedly performed over each neuron layer. Thereby, the parameter optimization for obtaining appropriate values of the parameters used in each neuron layer is performed. The difference obtained by the backward processing is sometimes referred to as gradient information when expressed by a differential coefficient or the like in image recognition or the like, for example. In this way, the parameters (or model parameters) are optimized to reduce the distance between a model function and the data.

In the parameter optimization, processing called "Allreduce" processing is performed in which differences acquired at each node by the backward processing are aggregated for each neuron layer and update data is obtained by a predetermined operation and distributed to each node. In the Allreduce processing, for example, gradient information of all nodes is added, and the added value is distributed to each node. Thereafter, at each node, update data may be obtained by dividing the added value by the number of nodes included in the parallel computer and taking an average.

It is known that DL calculation is different from HPC calculation which performs 32-bit or 64-bit floating-point arithmetic, for example and that even if the accuracy is somewhat low, a final result obtained is almost comparable to the result of HPC calculation, for example. Therefore, a model parameter is expressed by a low-bit integer to reduce the amount of data communication between nodes. It is possible to speed up the operations by reducing the data communication amount. For example, a graphics processing unit (GPU) has been proposed that supports 16-bit half-precision floating-point arithmetic and may achieve more than twice the throughput compared to 32-bit floating-point arithmetic. There is a technique for further improving a throughput by using a low-bit integer that is a fixed-point number.

However, in a parallel computer having, for example, four nodes, even if the gradient information is, for example, an 8-bit value, a register for 10 bits may be unavoidable during the Allreduce processing. For example, if the 8-bit value in each of the four nodes is an unsigned binary number "11111111", the added value of these values becomes a 10-bit value "1111111100". In this case, eventually, operations are performed in a 16-bit expression, and therefore the throughput is reduced by ½. When the number of nodes included in a parallel computer is increased to 512, for example, the added value may become 17 bits, and in this case, operations are performed in a 32-bit expression, and therefore the throughput is reduced to ¼.

Therefore, in order to suppress an overflow, the gradient information of each node may be divided by the number of nodes in advance before addition. However, in this case, although the occurrence of an overflow may be reduced, when the number of nodes included in the parallel computer is large, the quotient becomes very small or becomes 0, and therefore an error occurs at the time of addition, thereby deteriorating the operation accuracy. For example, if the 8-bit value in each of the 512 nodes included in the parallel computer is an unsigned binary number "11111111", the result obtained by dividing this value by the number of nodes "512" is an 8-bit value "00000000". Therefore, it is difficult to maintain the operation accuracy by avoiding an overflow.

In this manner, in the related art, when the number of nodes of the parallel computer increases, the throughput decreases, and if an attempt is made to improve the throughput by using a low-bit integer, the operation accuracy deteriorates, and therefore it is difficult to suppress the deterioration in operation accuracy by obtaining a node average.

Japanese Laid-open Patent Publication No. 2000-339278 and Japanese Laid-open Patent Publication No. 2000-20501 are examples of related art.

SUMMARY

According to an aspect of the embodiments, an arithmetic processing apparatus includes: a plurality of nodes (N nodes) capable of communicating with each other, each of the plurality of nodes including a memory and a processor, the memory being configured to store a value and an operation result using the value, the processor being configured to execute first processing when N is a natural number of 2 or more, n is a natural number of 1 or more, and $N \neq 2^n$, wherein the first processing is configured to divide by 2 a value held by a first node, the first node being any of the plurality of nodes and a last node in an order of counting, obtain one or more node pairs by pairing remaining nodes among the plurality of nodes exception for the first node, and calculate repeatedly an average value of values held by each node pair of the one or more node pairs.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating a method of calculating an average value of held data of two nodes;

FIG. 12 is a flowchart illustrating an example of normal all-node averaging processing; and FIG. 13 is a diagram illustrating the processing in FIG. 12 when N=6 and p=3.

DESCRIPTION OF EMBODIMENT(S)

As described above, in the related art, it is difficult to suppress the deterioration in operation accuracy by obtaining a node average.

Therefore, in one aspect, an object is to provide an arithmetic processing apparatus, a program, and a control method of the arithmetic processing apparatus, which may suppress the deterioration in operation accuracy by obtaining a node average.

According to one aspect, it is possible to suppress the operation accuracy from deteriorating by obtaining a node average.

Hereinafter, example of an arithmetic processing apparatus, a program, and a control method of the arithmetic processing apparatus disclosed in the present application will be described with reference to drawings.

EXAMPLE

Figure 1:
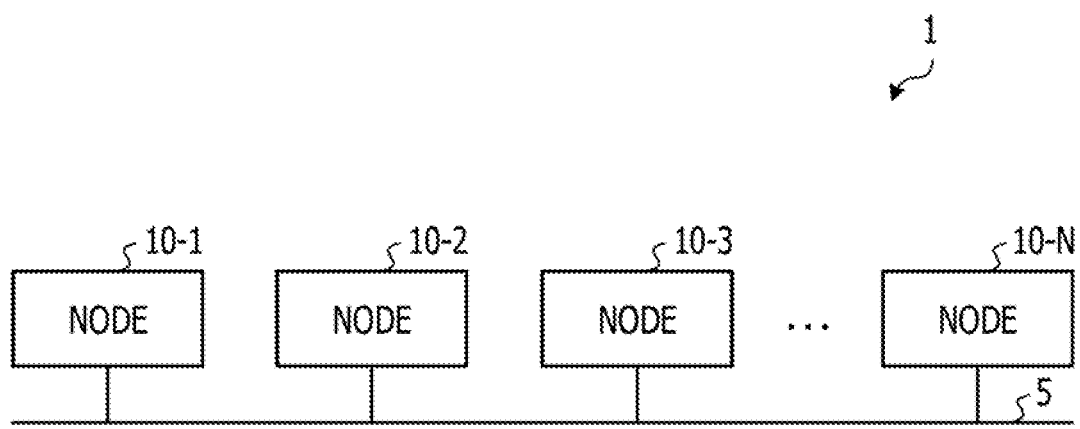
FIG. 1 is a block diagram illustrating an example of a parallel computer in one example.

FIG. 1 is a block diagram illustrating an example of a parallel computer in one example. A parallel computer 1 is an example of a computer having a plurality of nodes 10-1 to 10-N and is an example of an arithmetic processing apparatus in this example. N is a natural number of 2 or more. The nodes 10-1 to 10-N are coupled to each other via a network 5 and may mutually transmit and receive data via the network 5. The network 5 is an example of a communication path. For example, the nodes 10-1 to 10-N may communicate via the network 5.

The nodes 10-1 to 10-N execute, for example, DL. In DL, the nodes 10-1 to 10-N execute parameter optimization. The nodes 10-1 to 10-N calculate update data when optimizing parameters. Each of the nodes 10-1 to 10-N has gradient information which is numerical value data for calculating update data and executes Allreduce processing by using the gradient information of each of the nodes to calculate update data. In the following description, when the nodes 10-1 to 10-N are not distinguished from each other, the nodes may also be referred to as "node 10".

Figure 2:
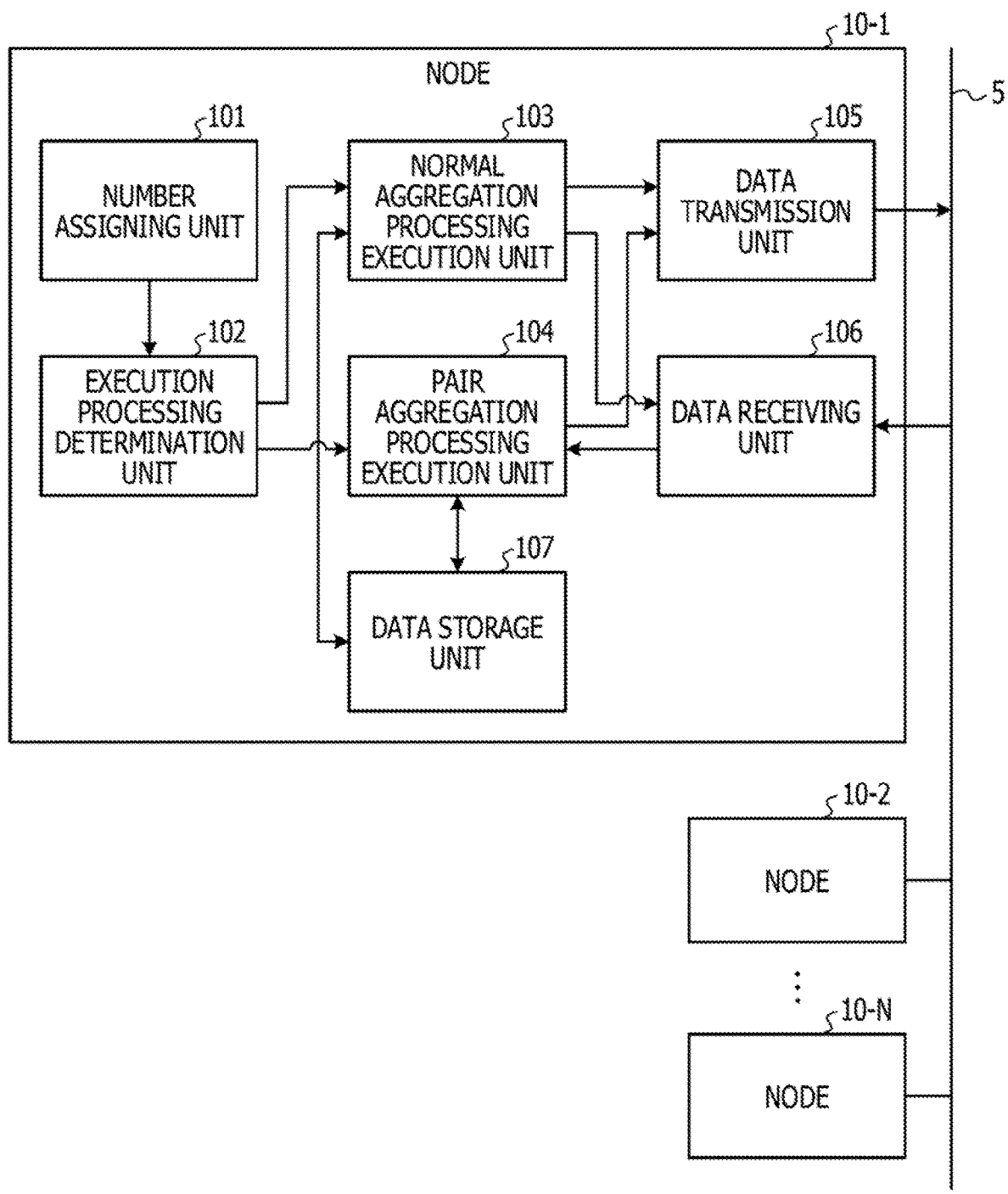
FIG. 2 is a block diagram illustrating an example of a functional configuration of a node.

Next, the Allreduce processing performed by the node 10 will be described with reference to FIG. 2. FIG. 2 is a block diagram illustrating an example of a functional configuration of a node. In this example, a case where averaging is performed as an operation in Allreduce processing will be described as an example. However, the operation in the Allreduce processing may be other operations, for example, addition, multiplication, acquisition of the maximum value, acquisition of the minimum value, and the like.

As illustrated in FIG. 2, the node 10-1 includes a number assigning unit 101, an execution processing determination unit 102, a normal aggregation processing execution unit 103, a pair aggregation processing execution unit 104, a data transmission unit 105, a data receiving unit 106, and a data storage unit 107. Since the node 10-2 to 10-N has the same configuration as that of the node 10-1, the illustration and description of the configuration of the node 10-2 to 10-N will be omitted. Each of the nodes 10-1 to 10-N executes various kinds of processing in the DL as described above, but for convenience in FIG. 2, the function of performing Allreduce processing will be described, and the illustration and description of other functions will be omitted.

The data storage unit 107 stores gradient information. The data storage unit 107 stores operation results, update data, and the like in the middle of calculating update data.

Figure 3:
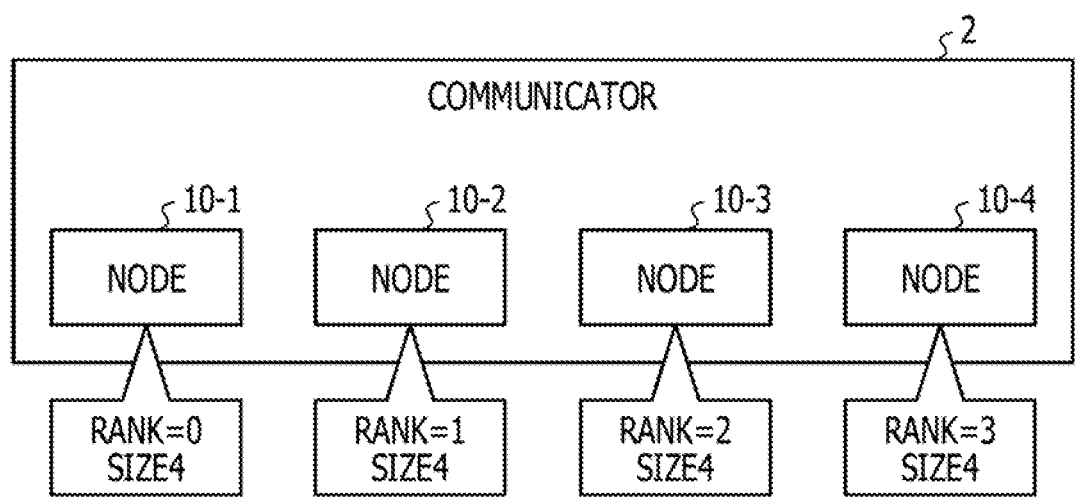
FIG. 3 is a diagram illustrating a case where MPI processing by a number assigning unit is N=4.

The number assigning unit 101 uses, for example, a message passing interface (MPI) function to generate a communicator 2 that is a group of processes that may communicate with each other as illustrated in FIG. 3. FIG. 3 is a diagram illustrating a case where MPI processing by the number assigning unit is N=4. Since each of the nodes 10-1 to 10-4 executes a process, the communicator 2 may be considered as a group of the nodes 10-1 to 10-4 as illustrated in FIG. 3, Each of the nodes 10-1 to 10-4 included in the communicator 2 holds information on the communicator 2. In this example, a case where each of the nodes 10-1 to 10-4 executes one process will be described as an example.

The number assigning unit 101 executes an MPI function to acquire the number of processes belonging to the communicator 2, for example, the size that is the number N of the nodes 10 in this example. In this example, since the nodes 10-1 to 10-4 are included in the communicator 2, the number assigning unit 101 acquires "4" as a size. The number assigning unit 101 executes the MPI function to set a rank that is an identification number for each process belonging to the communicator 2. The rank is assigned a value obtained by subtracting "1" from the number of all processes belonging to the communicator 2 in order from 0 in this example. In this example, since each of the nodes 10-1 to 10-4 performs one process, the rank may also be referred to as the number assigned to each of the nodes 10-1 to 10-4. The number assigning unit 101 sets the rank of the node 10-1 to "0", sets the rank of the node 10-2 to "1", sets the rank of the node 10-3 to "2", and sets the rank of the node 10-4 to "3". Thereafter, the number assigning unit 101 outputs the size and rank information assigned to each of the node 10-1 to 10-4 to the execution processing determination unit 102.

Returning to the description of FIG. 2, the execution processing determination unit 102 receives, from the number assigning unit 101, an input of information on the size of the communicator 2 and the rank assigned to each node 10. The execution processing determination unit 102 determines whether or not the number of targets of Allreduce processing is a power of "2". The number of targets of Allreduce processing is the total number of processes executed by the nodes 10 belonging to the communicator 2. In this example, each node 10 executes one process, and the number of targets of Allreduce processing is the number of the nodes 10 included in the communicator 2, which matches the size of the communicator 2.

When the number of the nodes 10 is not a power of "2", the execution processing determination unit 102 determines to execute normal all-node averaging processing. For example, the normal all-node averaging processing is processing in which the gradient information of all the nodes 10 is collected in one node 10 to obtain the sum of the gradient information, the sum is distributed to each node 10, and then each node 10 obtains an average value by dividing the sum of gradient information by the number of the nodes 10. In this case, the execution processing determination unit 102 instructs the normal aggregation processing execution unit 103 to execute the Allreduce processing. The execution processing determination unit 102 transmits the size information and the rank information of each node 10 to the normal aggregation processing execution unit 103.

On the other hand, when the number of the nodes 10 is a power of "2", the execution processing determination unit 102 determines to execute all-node averaging processing using a pair average. In this example, since the number of the nodes 10 is four, the number of the nodes 10 is "2" to the power of 2, and the execution processing determination unit 102 determines to execute the all-node averaging processing using a pair average. In this example, the all-node averaging processing using a pair average is processing in which the nodes 10 are paired by every two nodes each holding the gradient information or the operation result using the gradient information, and calculation of an average value of values held by the paired two nodes is repeated. Details and each example of the all-node averaging processing using the pair average will be described later. In this case, the execution processing determination unit 102 instructs the pair aggregation processing execution unit 104 to execute the Allreduce processing. The execution processing determination unit 102 transmits the size information and the rank information of each node 10 to the normal aggregation processing execution unit 103.

If the number of the nodes 10 is not a power of 2, the normal aggregation processing execution unit 103 receives an instruction to execute the Allreduce processing from the execution processing determination unit 102. The normal aggregation processing execution unit 103 determines an aggregation node that aggregates gradient information among the nodes 10 belonging to the communicator 2 based on the rank.

If the own node 10 is not an aggregation node, the data transmission unit 105 is caused to transmit the gradient information stored in the data storage unit 107 to the aggregation node. Thereafter, the normal aggregation processing execution unit 103 receives an input of the sum of gradient coefficients from the data receiving unit 106. The normal aggregation processing execution unit 103 calculates an average value by dividing the sum of the gradient coefficients by the size and stores the calculated average value in the data storage unit 107.

When the own node 10 is an aggregation node, the normal aggregation processing execution unit 103 receives an input of gradient information sent from another node 10 from the data receiving unit 106. The normal aggregation processing execution unit 103 obtains the sum of the gradient information and causes the data transmission unit 105 to transmit the obtained sum to each node 10. Thereafter, the normal aggregation processing execution unit 103 calculates the average value by dividing the sum of the gradient coefficients by the size and stores the calculated average value in the data storage unit 107.

When the number of the nodes 10 is a power of "2", the pair aggregation processing execution unit 104 receives an instruction to execute the Allreduce processing from the execution processing determination unit 102. The pair aggregation processing execution unit 104 initializes i representing the number of repetitions and sets i=0. The pair aggregation processing execution unit 104 sets j as an integer of 0 or more and sets the nodes 10 having ranks of 2j and 2j+1 as a pair. For example, if the rank of the own node 10 is 2j, the pair aggregation processing execution unit 104 determines that the node 10 having a rank of 2j+1 and the own node 10 are paired. If the rank of the own node 10 is 2j+1, the pair aggregation processing execution unit 104 determines that the node 10 having a rank of 2j and the own node 10 are paired. The pair aggregation processing execution unit 104 of the node 10 having a rank of 2j+1 transmits the gradient information stored in the data storage unit 107 to the node 10 having a rank of 2j set as a pair.

On the other hand, the pair aggregation processing execution unit 104 of the node 10 having a rank of 2j receives gradient information from the node 10 having a rank of 2j+1 set as a pair. Next, the pair aggregation processing execution unit 104 calculates an average value of the gradient information stored in the data storage unit 107 of the own node 10 and the received gradient information. The pair aggregation processing execution unit 104 stores the operation result in the data storage unit 107.

Next, the pair aggregation processing execution unit 104 increments i by 1 and determines whether or not i has reached n when the size is expressed as "2" to the n-th power. n is a natural number of 1 or more. If i has not reached n, the pair aggregation processing execution unit 104 assigns numbers in order from 0 to the nodes 10 that has calculated an average value of gradient information, for example, the nodes 10 having a rank of 2j, in order from the lowest rank. The pair aggregation processing execution unit 104 sets j as an integer equal to or greater than 0 and sets the nodes 10 having the assignment numbers 2j and 2j+1 as a pair.

The pair aggregation processing execution unit 104 of the node 10 having an assignment number of 2j receives the operation result from the node 10 having an assignment number of 2j+1. Next, the pair aggregation processing execution unit 104 calculates an average value of the operation result stored in the data storage unit 107 of the own node 10 and the received operation result. The pair aggregation processing execution unit 104 stores the operation result in the data storage unit 107.

Hereinafter, until i reaches n, the pair aggregation processing execution unit 104 repeats number assignment, data transmission from the node 10 having an assignment number of 2j to the node 10 having an assignment number of 2j+1, and calculation of an average value of the operation results.

When i reaches n, since there is no average value calculation result other than the own node 10, the pair aggregation processing execution unit 104 determines that the operation result stored in the data storage unit 107 of the own node 10 is an average value of all gradient information. The pair aggregation processing execution unit 104 instructs the data transmission unit 105 to transmit the average value of all the gradient information stored in the data storage unit 107 to each node 10. As described above, i is the number of repetitions of the averaging processing of the two nodes 10 already performed, and if the number of repetitions reaches a multiplier when the size is expressed as a power of "2", the average value of the gradient information of all the nodes 10 is obtained.

Figure 4:
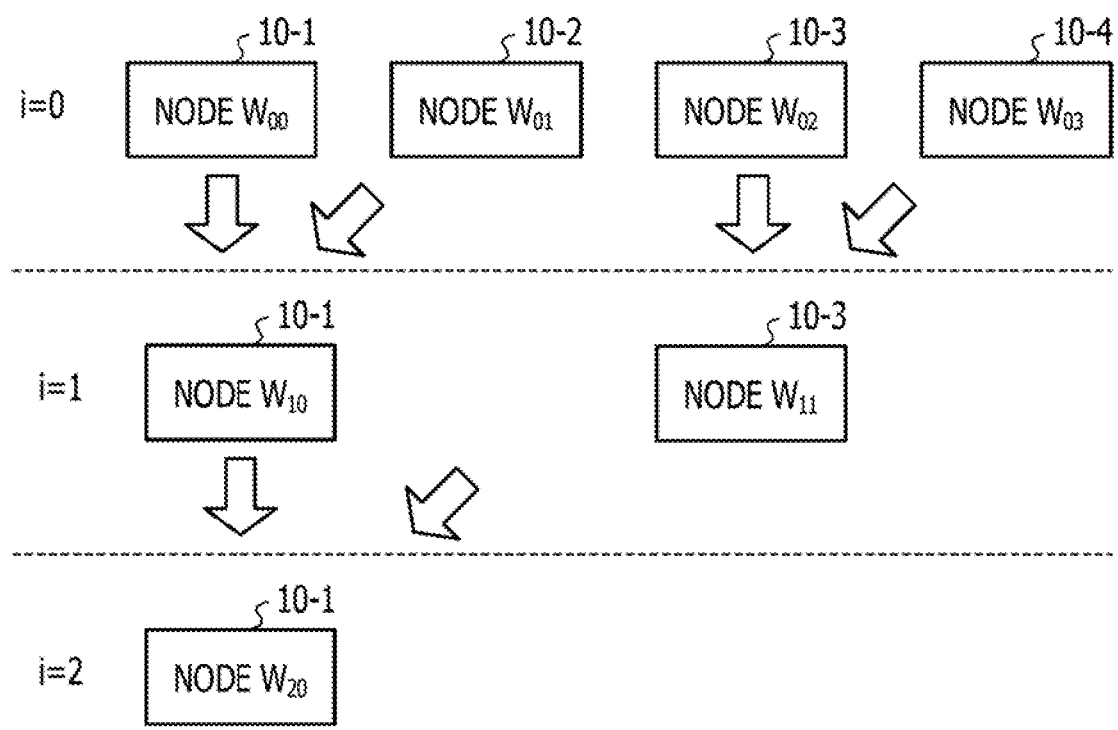
FIG. 4 is a diagram illustrating an example of aggregation processing of gradient information.

Next, a flow of aggregation processing of gradient information when the nodes 10-1 to 10-4 is used will be described with reference to FIG. 4. FIG. 4 is a diagram illustrating an example of aggregation processing of gradient information. i and the rank or assignment number of each of the nodes 10-1 to 10-4 are arranged as a subscript of W, and each of the nodes 10-1 to 10-4 in each stage of the aggregation processing of the gradient information is expressed. In i-th (i is an integer of 0 or more) averaging processing of the two nodes 10, among the nodes 10 having the operation results, a j-th (j is an integer 0 or more) node 10 from the lower rank number is expressed as a node $W_{ij}$. In FIG. 4, in the averaging processing of the two nodes 10, the node 10 that has transmitted the gradient information to the other nodes 10 is excluded.

As illustrated in FIG. 4, in the averaging processing of the two nodes 10 at i=0, the nodes 10-1 to 10-4 are expressed as a node $W_{00}$, a node $W_{01}$, a node $W_{02}$, and a node $W_{03}$. Since the rank of the node 10-1 is 0=2j (j=0), the node 10-1 is paired with the node 10-2 having a rank of 1=2j+1 (j=0). Since the rank of the node 10-3 is 2=2j (j=1), the node 10-3 is paired with the node 10-4 having a rank of 1=2j+1 (j=1).

The gradient information of the node 10-2 is transmitted to the node 10-1, and the node 10-1 calculates an average value of the gradient information of the node 10-1 and the gradient information of the node 10-2. The gradient information of the node 10-4 is transmitted to the node 10-3, and the node 10-3 calculates an average value of the gradient information of the node 10-3 and the gradient information of the node 10-4.

In the averaging processing of the two nodes 10 at i=1, the node 10-1 is expressed as a node $W_{10}$, and the node 10-3 is expressed as a node $W_{11}$. Since the node 10-1 has an assignment number of 0=2j (j=0) and the node 10-4 has an assignment number of 1=2j+1 (j=0), the node 10-3 is the sending side of the operation result.

Therefore, the node 10-3 transmits the operation result to be held to the node 10-1. The node 10-1 calculates an average value of the operation result held by the node 10-1 and the operation result held by the node 10-2.

In the averaging processing of the two nodes 10 at i=2, the node 10-1 is expressed as a node $W_{20}$. In this example, the size of the communicator 2 is "4", and at this time, i reaches a multiplier when the size of the communicator 2 is expressed by a power of "2". Therefore, the node 10-1 determines completion of the all-node averaging processing using a pair average.

Returning to the description of FIG. 2, the data transmission unit 105 receives a data transmission instruction from the normal aggregation processing execution unit 103 or the pair aggregation processing execution unit 104. The data transmission unit 105 transmits specified data to the destination node 10 specified by the instruction.

The data receiving unit 106 receives an operation result input from another node 10. The data receiving unit 106 outputs the received data to the normal aggregation processing execution unit 103 or the pair aggregation processing execution unit 104 that is a destination.

As described above, it is preferable that the following three conditions be satisfied in order for the pair aggregation processing execution unit 104 to execute the averaging processing of the two nodes 10 in the present example, A first condition is that the number of targets of Allreduce processing is a power of "2". A second condition is that the value to be averaged is "2"'s complement expression or unsigned. A third condition is that the operation order constitutes a binary tree.

Figure 5:
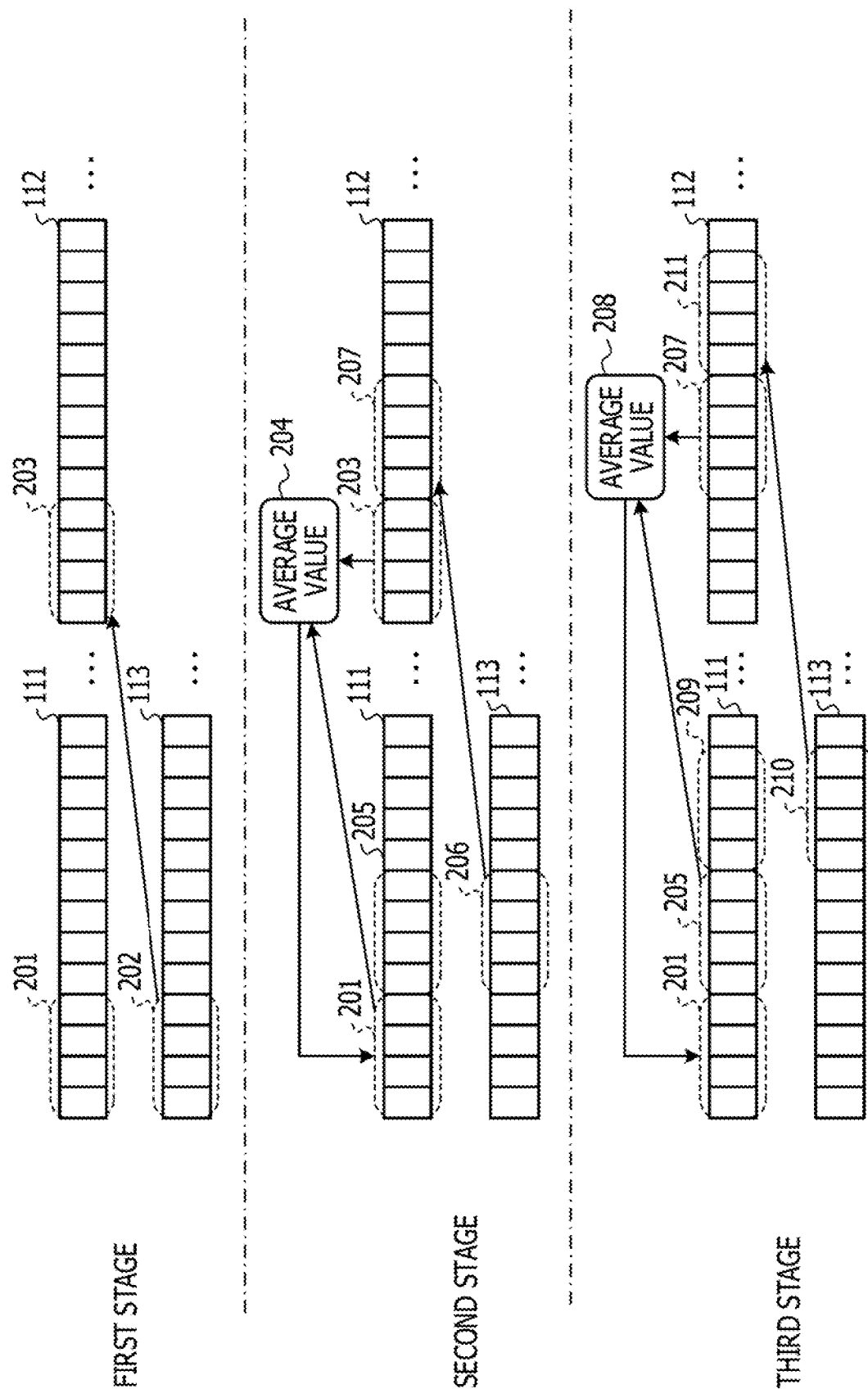
FIG. 5 is a diagram illustrating averaging processing in a pipeline.

The pair aggregation processing execution unit 104 according to the present example pipelines the execution of the averaging processing using the gradient information and operation result of the own node 10 to speed up the execution of all-node averaging processing using a pair average. Next, the averaging processing performed by the pair aggregation processing execution unit 104 in a pipeline will be described with reference to FIG. 5. FIG. 5 is a diagram illustrating averaging processing in a pipeline. A case where the node 10-1 receives gradient information from the node 10-2 and calculates an average value will be described.

In FIG. 5, a buffer 111 is a storage area for storing received data and operation result of the node 10-1 included in the data storage unit 107. A buffer 112 is a temporary storage area for received data of the node 10-1 included in the data storage unit 107. A buffer 113 is a storage area of data to be transmitted, which is included in the data storage unit 107 of the node 10-2. For example, the array data stored in the buffer 111 is an example of the gradient information of the node 10-1. The array data stored in the buffer 113 is an example of the gradient information of the node 10-2. When an average value of the gradient information of the node 10-1 and the node 10-2 is obtained, the node 10-2 transmits partial data of the array data to the node 10-1. The node 10-1 obtains an average value of the entire array data by repeating the calculation of an average value with the partial data of the array data of the own node 10-1 corresponding to the partial data of the received array data.

In a first stage, the node 10-1 receives the partial data stored in an area 202 of the buffer 113 and stores the partial data in an area 203 of the buffer 112.

In a next second stage, the node 10-1 calculates an average value 204 of the partial data stored in the area 201 of the buffer 111 and the partial data stored in the area 203 of the buffer 112 and stores the average value 204 in the area 201 of the buffer 111. In parallel with this processing, the node 10-1 receives the partial data stored in an area 206 of the buffer 113 and stores the partial data in an area 207 of the buffer 112.

In a next third stage, the node 10-1 calculates an average value 208 of the partial data stored in an area 205 of the buffer 111 and the partial data stored in the area 207 of the buffer 112 and stores the average value 208 the area 205 of the buffer 111. In parallel with this processing, the node 10-1 receives the partial data stored in an area 210 of the buffer 113 and stores the partial data in an area 211 of the buffer 112.

Thereafter, the node 10-1 repeats the averaging processing of the partial data in the array data that is the gradient information in parallel and completes the calculation of an average value of the entire array data. In this way, by repeating the averaging processing of the partial data in the array data that is the gradient information in a pipeline, the pair aggregation processing execution unit 104 may speed up the execution of the all-node averaging processing using a pair average.

Figure 6:
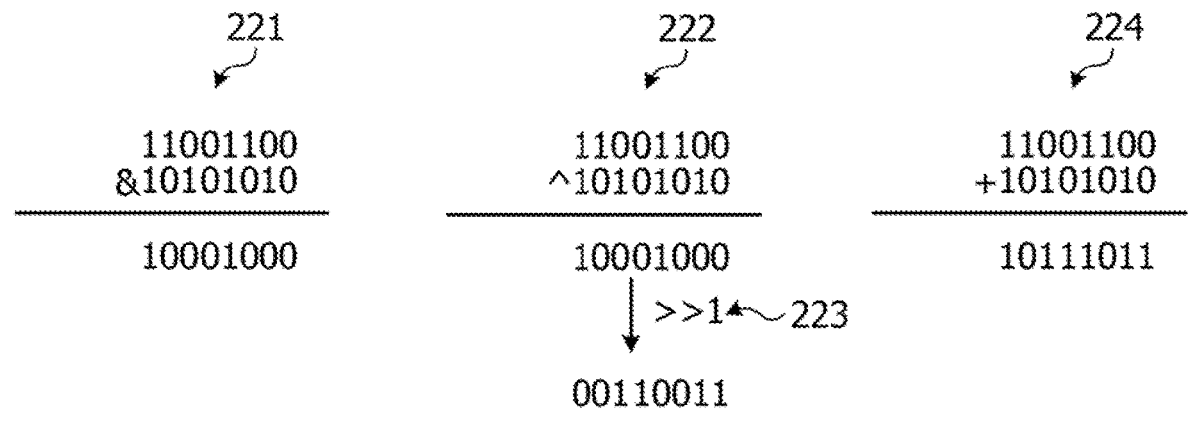

When the pair aggregation processing execution unit 104 calculates an average value of the values held by the two nodes 10, the occurrence of an overflow is avoided by executing the following operation. The calculation of an average value of the values held by the two nodes 10 by the pair aggregation processing execution unit 104 will be described with reference to FIG. 6. FIG. 6 is a diagram illustrating a method for calculating an average value of data held by two nodes.

When the value held by a reception-side node 10 is x0 and the value of a transmission-side node 10 is x1, the pair aggregation processing execution unit 104 calculates a first value by calculating a logical product of x0 and x1. The pair aggregation processing execution unit 104 calculate a second value by obtaining an exclusive OR of x0 and x1 and performing a 1-bit right shift. In the 1-bit right shift, the pair aggregation processing execution unit 104 adds 0 to the first bit of the shifted value. The 1-bit right shift corresponds to the division by "2". The pair aggregation processing execution unit 104 calculates an average value of x0 and x1 by adding the first value and the second value.

For example, when the logical product is expressed as "&", the exclusive OR is expressed as "^", and the 1-bit right shift operation is expressed as ">>1", the pair aggregation processing execution unit 104 obtains an average value of x0 and x1 by executing an operation expressed as (x0 & x1)+((x0 ^ x1)>>1). This operation method is a method in which an average value is calculated for each bit and added later, and is a rounding-down method using rounding to negative infinity.

When the bit values are the same between x0 and x1, the average value is obtained according to the following principle. First, bits having the same bit value are extracted by x0 & x1. In this case, since the bit values are the same, x0 & x1 is an average value as it is. On the other hand, when the bit values are different between x0 and x1, an average value is obtained by the following principle. First, bits having different bit values are extracted by x0 ^ x1, Since the bit values are different, the operation of dividing by 2 is converted into a shift operation (x0 ^ x1)>>1, thereby obtaining an average value of the bits having different bit values.

For example, a specific example will be described in the case of x0=11001100 and x1=10101010. In this case, if x0 and x1 are simply added and divided by 2, digit carry occurs during the addition, and an overflow occurs from the 8-bit data area.

On the other hand, the pair aggregation processing execution unit 104 in the present example calculates a logical product of x0 and x1 by an operation 221. In this case, the pair aggregation processing execution unit 104 acquires "10001000" as the first value that is the result of the operation 221. In the operation 221, no overflow occurs.

The pair aggregation processing execution unit 104 obtains an exclusive OR of x0 and x1 by an operation 222 and performs a 1-bit right shift by an operation 221. In this case, the pair aggregation processing execution unit 104 acquires "01100110" as the second value that is the result of the operation 222. No overflow occurs even in the operation 222.

The pair aggregation processing execution unit 104 calculates an added value of the first value and the second value by an operation 224. Thereby, the pair aggregation processing execution unit 104 obtains "101111011" as the operation result. In this case, since the most significant digit of the second value is 0, no overflow occurs due to the addition. The calculated value is equal to the calculated average value of x0 and x1 by simply adding 0 and x1 and dividing by "2". For example, the pair aggregation processing execution unit 104 may calculate an average value of x0 and x1 by this operation. In this way, the pair aggregation processing execution unit 104 may calculate an average value of x0 and x1 without causing an overflow.

Figure 7:
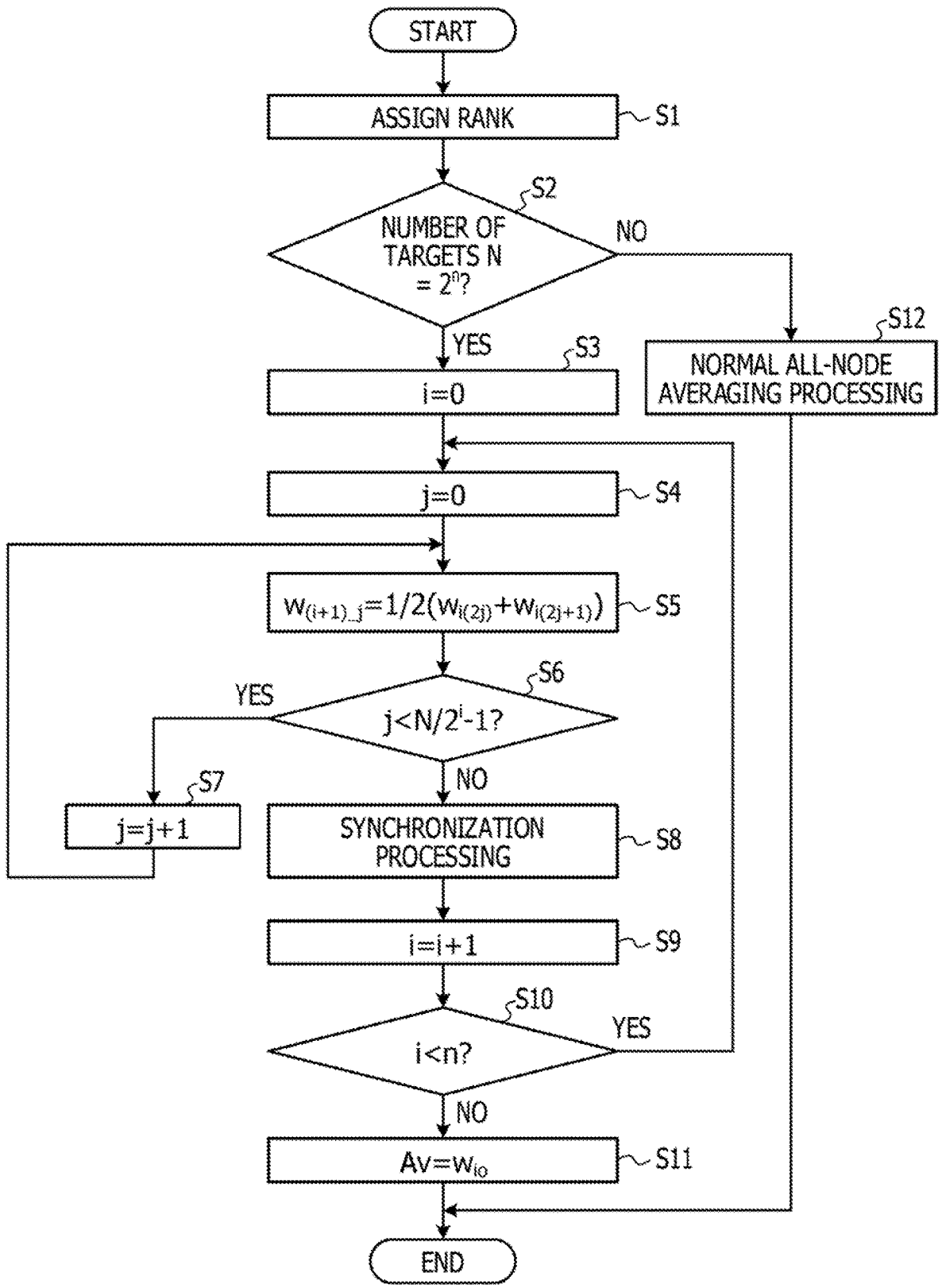
FIG. 7 is a flowchart illustrating Allreduce processing by a parallel computer in one example.

Next, the Allreduce processing performed by the parallel computer 1 in one example will be described with reference to FIG. 7. FIG. 7 is a flowchart illustrating Allreduce processing by the parallel computer in one example. In the following description, the gradient information and the operation result held by the node 10 may be collectively referred to as "held data".

Figure 8:
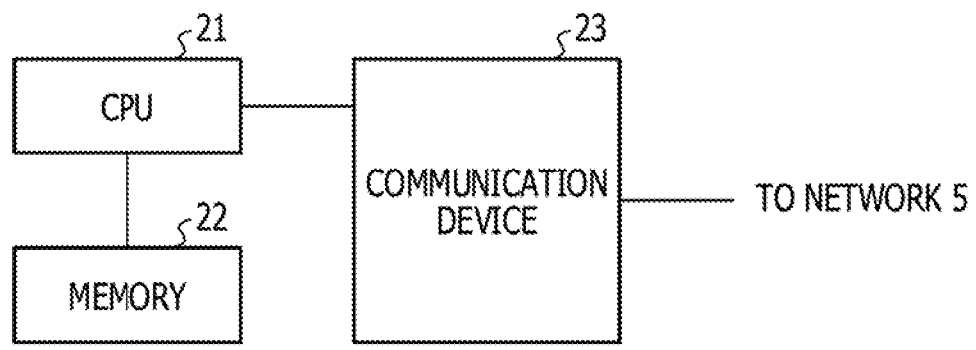
FIG. 8 is a block diagram illustrating an example of a hardware configuration of the node.

FIG. 8 is a block diagram illustrating an example of a hardware configuration of a node. The node 10 illustrated in FIG. 8 includes a central processing unit (CPU) 21, a memory 22, and a communication device 23. The CPU 21 is an example of a processor that executes operations and controls all the nodes 10. The CPU 21 executes the program stored in the memory 22, thereby realizing the functions of the respective units 101 to 104 illustrated in FIG. 2, For example, the CPU 21 may execute the Allreduce processing illustrated in FIG. 7.

The memory 22 is an example of a storage device for storing programs, data, and the like, and may form the data storage unit 107 illustrated in FIG. 2. The memory 22 may be formed by a computer-readable recording medium such as a portable recording medium, a semiconductor storage device, a magnetic recording medium, an optical recording medium, or a magneto-optical recording medium. The portable recording medium includes a Universal Serial Bus (USB) memory or the like. The semiconductor storage device includes a flash memory and the like. The optical recording medium includes a compact disk read-only memory (CD-ROM), a digital versatile disk (DVD), and the like. When a magnetic recording medium such as a disk or the like, an optical recording medium or a magneto-optical recording medium is used as the memory 22, the recording medium is loaded into a drive such as a disk drive, and a program or the like is read from the recording medium by the drive, and data or the like is written into the recording medium as occasion demands.

The communication device 23 is an example of a transmission/reception device capable of coupling the node 10 to the network 5, and may form the data transmission unit 105 and the data receiving unit 106 illustrated in FIG. 2.

It goes without saying that the hardware configuration of the node 10 is not limited to the configuration illustrated in FIG. 8.

When the Allreduce processing in FIG. 7 is started, the number assigning unit 101 performs MPI processing to generate the communicator 2 and assigns a rank to the size of the communicator 2 and each node 10 belonging to the generated communicator 2 (step S1). Thereafter, the number assigning unit 101 outputs the size information and rank information of the communicator 2 to the execution processing determination unit 102.

The execution processing determination unit 102 receives inputs of the size information and rank information of the communicator 2 from the number assigning unit 101. The execution processing determination unit 102 sets the size of the communicator 2 to the number N of targets that is the number N of the nodes 10 to be subjected to Allreduce processing. The execution processing determination unit 102 determines whether or not the number N of targets may be expressed as "2" to the n-th power, for example, N=$2^n$ (step S2).

When he number N of targets may be expressed as "2" to the n-th power (step S2: Yes), the execution processing determination unit 102 requests the pair aggregation processing execution unit 104 to execute the Allreduce processing. In response to the request to execute the Allreduce processing, the pair aggregation processing execution unit 104 initializes i to 0 (step S3).

Next, the pair aggregation processing execution unit 104 initializes j to 0 (step S4).

Next, the pair aggregation processing execution unit 104 sequentially assigns numbers in order from 0 as assignment numbers from the lower rank side of the node 10 that has not transmitted the held data to another node 10. The pair aggregation processing execution unit 104 of the node 10 of which assignment number is expressed as 2j+1 transmits the data held by the own node 10 to the node 10 of which assignment number is expressed as 2j. On the other hand, the node 10 of which assignment number is expressed as 2j calculates an average value of the held data of the own node 10 and the received held data. In i-th averaging processing of the two nodes 10, the held data of the node 10 of which assignment number is expressed as 2j is $W_{i(2j)}$, and the held data of the node 10 of which assignment number is expressed as 2j+1 is $W_{i(2j+1)}$. In the (i+1)th averaging processing of the two nodes 10, the held data of a j-th node 10 from the lower rank side is expressed as $W_{(i+1)j}$. In this case, the node 10 of which assignment number is expressed as 2j in the i-th processing becomes the j-th node 10 in the i+1th processing, and the pair aggregation processing execution unit 104 thereof performs an operation expressed as $W_{(i+1)j} = \frac{1}{2} \cdot (W_{i(2j)} + W_{i(2j+1)})$ (step S5).

The pair aggregation processing execution unit 104 determines whether or not j has reached a multiplier when N is expressed as a power of "2", for example, j<N/$2^i$−1 (step S6). If j<N/$2^i$−1 (step S6: Yes), the pair aggregation processing execution unit 104 increments j by 1 (step S7) and returns to the processing of step S5.

On the other hand, if j<N/$2^i$−1 is not satisfied (step S6: No), the pair aggregation processing execution unit 104 executes synchronization processing (step S8). The synchronization processing is processing of waiting until the averaging processing is completed in all the i-th nodes 10 of which assignment numbers are 2j.

Next, the pair aggregation processing execution unit 104 increments i by one (step S9).

Next, the pair aggregation processing execution unit 104 determines whether or not i has reached a multiplier when the size of the communicator 2 is expressed as a power of "2", for example, whether or not i<n (step S10). If i<n (step S10: Yes), the pair aggregation processing execution unit 104 returns to the processing of step S4.

On the other hand, when i<n is not satisfied (step S10: No), the pair aggregation processing execution unit 104 determines that Av, which is an average value of the gradient information of all the nodes 10, is $W_{i0}$ (step S11), and the processing ends.

On the other hand, when the number of targets N may not be expressed as "2" to the n-th power (step S2: No), the execution processing determination unit 102 requests the normal aggregation processing execution unit 103 to execute the Allreduce processing. In response to the request to execute the Allreduce processing, the normal aggregation processing execution unit 103 executes normal ail-node processing executes normal all-node averaging processing according to the following equation (1), for example (step S12), and the processing ends.

$$Av = \frac{1}{N} \sum_{i=0}^{N-1} w_{0i} \qquad (1)$$

As described above, if the number N of targets may be expressed as "2" to the n-th power, the parallel computer 1 according to the present example executes the Allreduce processing for all nodes by repeating the operation of Allreduce processing in which two nodes are paired. As a result, the parallel computer 1 may reduce operation errors and suppress the data transfer amount and may improve the throughput without sacrificing the operation accuracy. The parallel computer 1 may execute averaging processing for all nodes without causing an overflow by obtaining an average value of two values by an operation using a logical product and an exclusive OR. The averaging operation is completed in a very short time compared to the inter-node communication and the data reading and writing processing from the buffer. By pipelining the data communication in the averaging processing and the processing of reading and writing data from and into the buffer, the parallel computer 1 may overlap and hide the processing time. Thereby, the parallel computer 1 may suppress performance deterioration due to an increase in the number of times of averaging processing.

In step S12, the norm& aggregation processing execution unit 103 may execute the normal all-node averaging processing in accordance with the following equation (2), for example, in response to a request to execute the Allreduce processing. p is a natural number satisfying $2^{p-1} < N < 2^p$.

$$Av = \sum_{i=0}^{N-1} \frac{x_i}{N} = \sum_{i=0}^{N-1} \frac{x_i}{2^p} \cdot \frac{2^p}{N} \qquad (2)$$

In the rightmost mathematical expression of the above equation (2), the term $x_i/2^p$ is a quotient obtained by dividing the value held by each node 10 by "2" p times. The term is a value obtained by adding the term $x_i/2^p$ from i=1 to i=N−1. The term $2^p/N$ is a value which is equal to or greater than "1" and less than "2", which is uniquely determined by N and p. For example, in the case of an even number, processing of taking an average of two is repeated, and in the case of an odd number, processing of dividing only one by "2" and taking an average of other two is repeated, and finally multiplied by a fixed value of $2^p/N$.

In this way, a dummy node is added to an actual node, or the node of the power of "2" is selected from an actual node so that the number N of nodes to be subjected to the average operation becomes a power of "2". The dummy nodes are distributed among the actual nodes to avoid concentration of load on a specific node.

Figure 9:
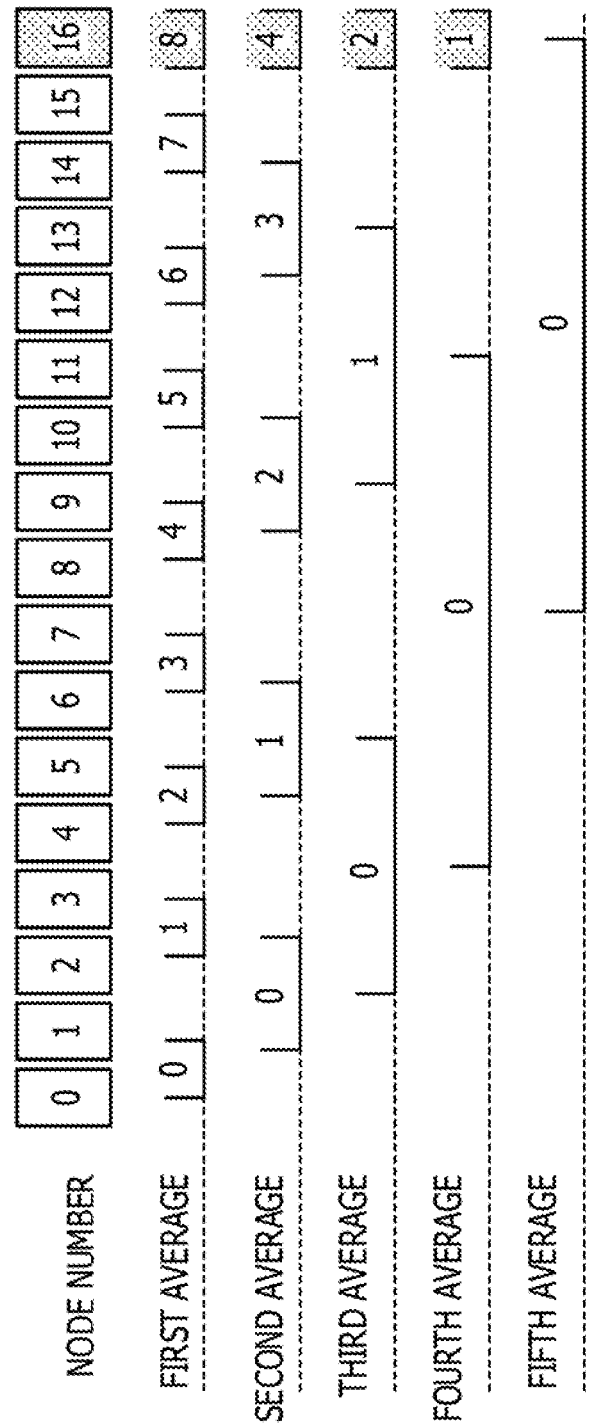
FIG. 9 is a diagram illustrating an example of a case where the order of counting nodes is fixed.

When the order of counting the nodes is fixed, there is a possibility that only a value held by a specific node continues to be biasedly divided by "2" and the quotient is very small or even zero. FIG. 9 is a diagram illustrating an example of a case where the order of counting nodes is fixed. FIG. 9 illustrates an example in which the number of the nodes 10 is 17, and a row of "node number" indicates the number "0" to "17" of the nodes 10 assigned to the node 10. As described above, when each node 10 executes one process, the number assigned to the node 10 and the rank assigned to the process executed by the node 10 are the same. In each row of "first average" to "fifth average", the numbers "0", . . . indicate the order of positions where the average operation of the values held by the two nodes 10 is performed. In each row, the numbers filled with gray dots indicate positions where the value held by one node 10 is divided by "2" (for example, a ½ operation).

In the first average of FIG. 9, the average operation of the nodes 10 at the numbers "0" and "1" is performed at the position of the number the average operation of the nodes 10 at the numbers "14" and "15" is performed at the position of the number "7", and a ½ operation is performed on the value held by the node 10 of the number "16" at the position of the number "8" filled with gray dots. In the second average, the average operation of the values obtained at the positions of the numbers "0" and "1" in the first average is performed at the position of the number "0", . . . and the average operation of the values obtained at the positions of the numbers "6" and "7" in the first average is performed at the position of the number "3". In the second average, a ½ operation is performed on the value of the number "8" of the first average at the position of the number "4" filled with gray dots. In the third average, the average operation of the values obtained at the positions of the second average at the numbers "0" and "1" is performed at the position of the number "0", and the average operation of the values obtained at the positions of the second average at the numbers "2" and "3" is performed at the position of the number "1". In the third average, a ½ operation is performed on the value of the number "4" of the second average at the position of the number "2" filled with gray dots. In the fourth average, the average operation of the values obtained at the positions of the third average at the numbers "0" and "1" is performed at the position of the number "0", and a ½ operation is performed on the value of the third average at the number "2" at the position of the number "1" filled with gray dots. In the fifth average, the average operation of the value obtained at the position of the number "0" in the fourth average and the value obtained at the position of the number "1" in the fourth average is performed at the position of the number "0".

For example, in this example, the above equation (2) is as follows.

$$\sum_{i=0}^{16} \frac{x_i}{17} = \sum_{i=0}^{16} \frac{x^i}{2^5} \cdot \frac{2^5}{17}$$

The above phenomenon that occurs when the order of counting nodes is fixed may occur even when the order of counting nodes is randomized.

Figure 10:
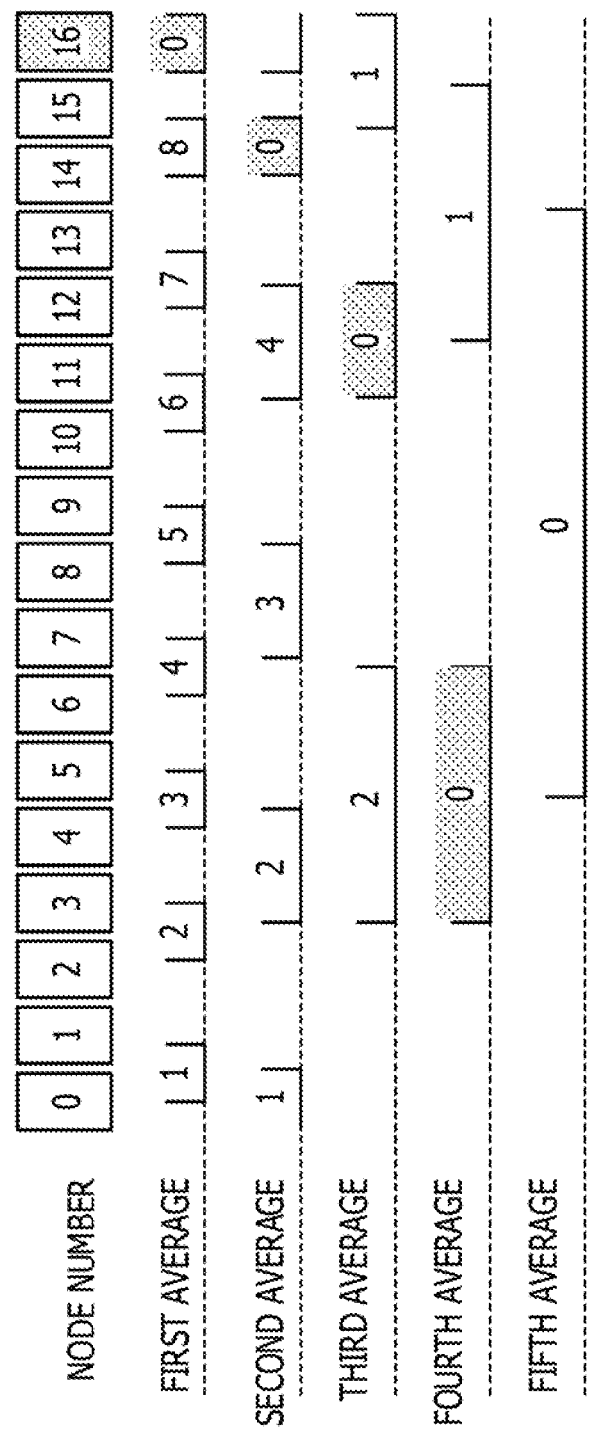
FIG. 10 is a diagram illustrating an example in which the order of counting nodes is changed.

Therefore, a case where the order of counting the nodes is changed will be described. FIG. 10 is a diagram illustrating an example in which the order of counting nodes is changed. FIG. 10 illustrates an example in which the number of the nodes 10 is 17, and a row of "node number" indicates the number "0" to "16" of the nodes 10 assigned to the node 10. As described above, when each node 10 executes one process, the number assigned to the node 10 and the rank assigned to the process executed by the node 10 are the same. In each row of the "first average" to "fifth average", the number "0" filled with gray dots indicates the first position to be divided by "2" (for example, ½ operation), and the numbers "0", "1", . . . indicate the order of positions where the average operation of the values held by the two nodes 10 is performed.

In the first average of FIG. 10, a ½ operation is performed on the values held by the node 10 at the number "16" at the position of the number "0" filled with gray dots, and the average operation is performed of the nodes 10 at the numbers "0" and "1" at the position of the number "1", . . . the average operation is performed on the nodes 10 at the numbers "14" and "15" at the position of the number "8". In the second average, a ½ operation is performed on the value of the number "8" of the first average at the position of the number "0" filled with gray dots. In the second average, the average operation of the values obtained at the positions of the numbers "0" and "1" in the first average is performed at the position of the number "1", and the average operation of the values obtained at the positions of the numbers "6" and "7" in the first average is performed at the position of the number "4". In the third average, a ½ operation is performed on the value of the number "4" of the second average at the position of the number "0" filled with gray dots. In the third average, the average operation of the values obtained at the positions of the numbers "0" and "1" in the second average is performed at the position of the number "1", and the average operation of the values obtained at the positions of the numbers "2" and "3" in the second average is performed at the position of the number "2". In the fourth average, a ½ operation is performed on the value of the number "2" of the third average at the position of the number "0" filled with gray dots. In the fourth average, the average operation of the values obtained at the positions of the numbers "0" and "1" in third average is performed at the position of the number "1". In the fifth average, the average operation of the values obtained at the positions of the numbers "0" and "1" in the fourth average is performed at the position of the number "0".

As illustrated in FIG. 10, when the number N of the nodes 10 is an odd number, instead of fixing a first in the order of counting, an order of the last node 10 in the order of counting is used first, and the value of the node 10 is divided by "2". When the number of operation results is odd, the value of the node 10 is divided by "2" with the order of a previous last operation result as a first, the average operation of a previous first operation result and the subsequent operation result is performed, and thereafter, the average operation of two consecutive operation results is performed in the order of the previous operation results. When the number of operation results is even, the average operation of the previous first and subsequent operation results is performed, and thereafter, the average operation of two consecutive operation results is performed in the order of the previous operation results. Even when the number N of the nodes 10 having the largest odd number is $2^{p+1}+1$, averaging is performed while avoiding duplication of the values divided by "2" as much as possible, thereby suppressing the bias of the positions to be divided by "2".

Figure 11:
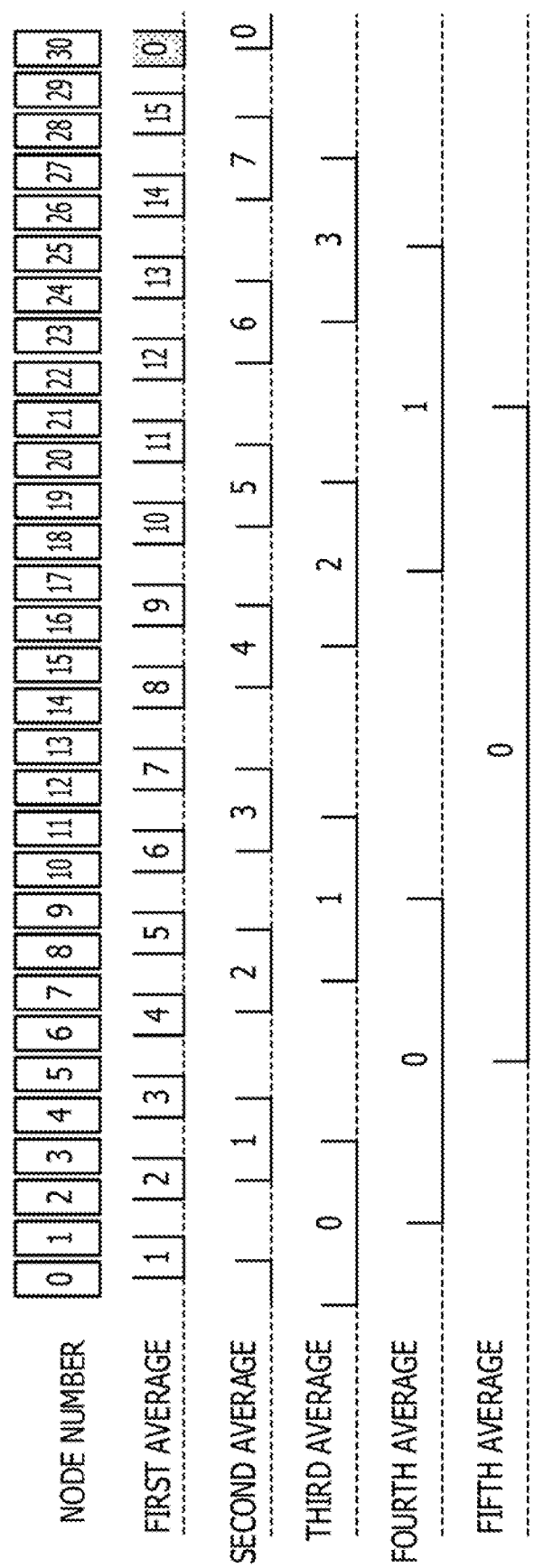
FIG. 11 is a diagram illustrating another example in which the order of counting nodes is changed.

FIG. 11 is a diagram illustrating another example in which the order of counting nodes is changed. FIG. 11 illustrates an example in which the number of the nodes 10 is 31, and a row of "node number" indicates the number "0" to "30" of the nodes 10 assigned to the node 10. As described above, when each node 10 executes one process, the number assigned to the node 10 and the rank assigned to the process executed by the node 10 are the same. In each row of the "first average" to "fifth average", the number "0" filled with gray dots indicates the first position to be divided by "2" (for example, ½ operation), and the numbers "0", "1", . . .

indicate the order of positions where the average operation of the values held by the two nodes 10 is performed.

In the first average of FIG. 11, a ½ operation is performed on the values held by the node 10 at the number "30" at the position of the number "0" filled with gray dots, and the average operation is performed of the nodes 10 at the numbers "0" and "1" at the position of the number "1", . . . the average operation is performed on the nodes 10 at the numbers "28" and "29" at the position of the number "15". In the second average, the average operation of the values obtained at the positions of the numbers "0" and "1" in the first average is performed at the position of the number "0". In the second average, the average operation of the values obtained at the positions of the number "2" and "3" in the first average is performed at the position of the number "1", and the average operation of the values obtained at the positions of the numbers "14" and "15" in the first average is performed at the position of the number "7". In the third average, the average operation of the values obtained at the positions of the numbers "0" and "1" in the second average is performed at the position of the number "0", and the average operation of the values obtained at the positions of the numbers "2" and "3" in the second average is performed at the position of the number "1". In the third average, the average operation of the values obtained at the positions of the number "4" and "5" in the second average is performed at the position of the number "2", and the average operation of the values obtained at the positions of the numbers "6" and "7" in the second average is performed at the position of the number "3". In the fourth average, the average operation of the values obtained at the positions of the numbers "0" and "1" in the third average is performed at the position of the number "0", and the average operation of the values obtained at the positions of the numbers "2" and "3" in the third average is performed at the position of the number "1". In the fifth average, the average operation of the values obtained at the positions of the numbers "0" and "1" in the fourth average is performed at the position of the number "0".

As illustrated in FIG. 11, when the number of the nodes 10 is $2^p-1$, for example, only one position where an order of the last node 10 in the order of counting is used first and the value held by the node 10 is divided by "2" occurs. For example, instead of fixing a first in an order of counting, an order of the last node 10 in the order of counting is used first, and the value held by the last node 10 is divided by "2". The average operation of the previous first and subsequent operation results is performed, and thereafter, the average operation of two consecutive operation results is performed in the order of the previous operation results. Therefore, averaging is performed so as to avoid duplication of the value divided by "2" as much as possible, thereby suppressing the bias of the positions to be divided by "2". Therefore, in this example, the above equation (2) is as follows.

$$\sum_{i=0}^{30} \frac{x_i}{31} = \sum_{i=0}^{30} \frac{x_i}{2^5} \cdot \frac{2^5}{31}$$

FIG. 12 is a flowchart illustrating an example of normal all-node averaging processing. The processing illustrated in FIG. 12 is executed by the normal aggregation processing execution unit 103 illustrated in FIG. 2, for example, in accordance with the above equation (2) when the determination result in the step S2 illustrated in FIG. 7 is No. p is a natural number satisfying $2^{p-1}<N<2^p$. A case where each node 10 executes one process will be described as an example. It is a precondition that the value to be averaged satisfies the above second condition that the value is a complement expression of "2" or is unsigned.

The normal aggregation processing execution unit 103 assigns the numbers of the nodes 10 to the nodes 10 in the order of counting from "0" to "N−1" (step S121). The normal aggregation processing execution unit 103 sets i=0 and N'=N (step S122) and sets j=0 (step S123). The normal aggregation processing execution unit 103 determines whether or not N' is an even number (step S124). If the determination result is Yes, the processing proceeds to step S125, and if the determination result is No, the processing proceeds to step S141 described below.

The normal aggregation processing execution unit 103 performs an operation expressed as $W_{(i+1)j}=(\frac{1}{2})\cdot(W_{i(2j)}+W_{i(2j+1)})$ (step S125). The normal aggregation processing execution unit 103 increments j by one (step S126) and determines whether or not j<N'/2 is satisfied (step S127). If the determination result in step S127 is Yes, the processing returns to step S125; and if it is No, the processing proceeds to step S128. The normal aggregation processing execution unit 103 calculates N'=N'/2 (step S128).

After step S128, the normal aggregation processing execution unit 103 executes synchronization processing (step S129). The synchronization processing is processing of waiting until the averaging processing is completed in all the i-th nodes 10 of which assignment numbers are 2j. After step S129, the normal aggregation processing execution unit 103 increments i by one (step S130) and determines whether or not i<p is satisfied (step S131). If the determination result in step S131 is Yes, the processing returns to step S123, and if it is No, the processing proceeds to step S132. The normal aggregation processing execution unit 103 determines that Av, which is an average value of gradient information of the nodes 10, is $W_{i0}\cdot 2^p/N$ (step S132), and the processing ends.

On the other hand, when the determination result in step S124 is No, the normal aggregation processing execution unit 103 performs an operation expressed as $W_{(i+1)0}=(\frac{1}{2})\cdot(W_{i(N'-1)})$ (step S141) and performs an operation expressed as $W_{(i+1)(j+1)}=(\frac{1}{2})\cdot(W_{i(2j)}+W_{i(2j+1)})$ (step S143). The normal aggregation processing execution unit 103 increments j by one (step S143) and determines whether or not j<(N'/2−½) is satisfied (step S144). If the determination result in step S144 is Yes, the processing returns to step S142; and if it is No, the processing proceeds to step S145. The normal aggregation processing execution unit 103 performs an operation expressed as N'=N'/2+½ (step S145), and the processing proceeds to step S129 described above.

FIG. 13 is a diagram illustrating the processing in FIG. 12 when N=6 and p=3. In FIG. 13, in the averaging processing of the two nodes 10 at i=0 (N' is an even number), values $W_{00}$ to $W_{05}$ are obtained at the nodes having the numbers "0" to "5", respectively.

In the averaging processing of the two nodes 10 at i=1 (N' is an odd number), a value $W_{10}=(\frac{1}{2})\cdot(W_{00}+W_{01})$ is calculated from the values $W_{00}$ and $W_{01}$ held by the nodes 10 having the numbers "0" and "1", respectively. A value $W_{11}=(\frac{1}{2})\cdot(W_{02}+W_{03})$ is calculated from the values $W_{02}$ and $W_{03}$ held by the nodes 10 having the numbers "2" and "3". A value $W_{12}=(\frac{1}{2})\cdot(W_{04}\pm W_{05})$ is calculated from the values $W_{04}$ and $W_{05}$ held by the nodes 10 having the numbers "4" and "5".

In the averaging processing of the two nodes 10 at i=2 (N' is an even number), a value $W_{21}=(\frac{1}{2})*(W_{10}+W_{11})$ is calculated from the calculated values $W_{10}$ and $W_{11}$. A value $W_{20}=W_{12}/2$ is calculated from the calculated value $W_{12}$.

In the averaging processing of the two nodes 10 at i=3 (i=p), a value $W_{30}=(1/2)\cdot(W_{20}+W_{21})$ is calculated from the calculated values $W_{21}$ and $W_{22}$.

Therefore, in the example illustrated in FIG. 13, the normal aggregation processing execution unit 103 determines that Av, which is an average value of gradient information pf all six nodes 10, is $W_{i0}\cdot 2^p/N=W_{30}\cdot 2^3/6$.

As described above, according to the normal all-node averaging processing illustrated in FIG. 12, it is possible to suppress the deterioration in operation accuracy by obtaining a node average. When the number of the nodes is not a power of "2", it is possible to suppress the occurrence of an overflow and the decrease in throughput by calculating an average of all nodes. The occurrence of an overflow may be suppressed even if redundant bits are not secured. Therefore, it is possible to suppress the decrease in throughput due to the occurrence of an overflow. As a result, it is possible to perform high-throughput averaging of all nodes without sacrificing the accuracy of the final data.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing apparatus of performing parallel computing, the arithmetic processing apparatus comprising:

N nodes (N is a natural number of 2 or more) configured to perform the parallel computing and communicate with each other, each of the N nodes including a memory and a processor circuit, the memory being configured to store a value and an operation result using the value and further being configured to store an index value corresponding to the each node, the arithmetic processing apparatus including a processor circuit configured to perform the parallel computing with the N nodes, the processor circuit of each node of the N nodes is configured to perform processing, the processing including:

obtaining a size value indicating a number of the N nodes;

in response to the obtaining of the size value, determining whether the obtained size value is not equal to 2n (n is a natural number of 1 or more); and in a case where the obtained size value is not equal to 2n and is an odd number, executing first averaging processing including:

in a case where the index value stored in the memory of the each node indicates a particular node of the N nodes, obtaining an average value with respect to the particular node of the N nodes by dividing by 2 the value held by the each node; and in a case where the index value stored in the memory of the each node indicates any of remaining nodes of the N nodes other than the particular node, obtaining an average value with respect to the each node by performing average on values held by a pair of the each node and another node determined by grouping the remaining nodes per two nodes.

2. A non-transitory computer-readable storage medium for storing a program of performing parallel computing with the N nodes, the program comprising instructions which cause each of the N nodes to perform processing, each of the N nodes being capable of communicating with each other, each of the N nodes being an apparatus including a memory and a processor circuit, the memory being configured to store a value and an operation result using the value and further being configured to store an index value corresponding to the each node, the processing performed by the processor circuit of each node of the N nodes comprising:

obtaining a size value indicating a number of the N nodes;

in response to the obtaining of the size value, determining whether the obtained size value is not equal to 2n (n is a natural number of 1 or more); and in a case where the obtained size value is not equal to 2n and is an odd number, executing first averaging processing including:

in a case where the index value stored in the memory of the each node indicates a particular node of the N nodes, obtaining an average value with respect to the particular node of the N nodes by dividing by 2 the value held by the each node; and in a case where the index value stored in the memory of the each node indicates any of remaining nodes of the N nodes other than the particular node, obtaining an average value with respect to the each node by performing average on values held by a pair of the each node and another node determined by grouping the remaining nodes per two nodes.

3. A control method of an arithmetic processing apparatus including N nodes (N is a natural number of 2 or more) configured to perform the parallel computing and communicate with each other, each of the N nodes including a memory and a processor circuit, the memory being configured to store a value and an operation result using the value and further being configured to store an index value corresponding to the each node, the method performed by the processor circuit of each node of the N nodes comprising:

obtaining a size value indicating a number of the N nodes;

in response to the obtaining of the size value, determining whether the obtained size value is not equal to 2n (n is a natural number of 1 or more); and in a case where the obtained size value is not equal to 2n and is an odd number, executing first averaging processing including:

in a case where the index value stored in the memory of the each node indicates a particular node of the N nodes, obtaining an average value with respect to the particular node of the N nodes by dividing by 2 the value held by the each node; and in a case where the index value stored in the memory of the each node indicates any of remaining nodes of the N nodes other than the particular node, obtaining an average value with respect to the each node by performing average on values held by a pair of the each node and another node determined by grouping the remaining nodes per two nodes.

* * * * *